United States Patent
Cmielowski et al.

(10) Patent No.: US 12,254,065 B2
(45) Date of Patent: Mar. 18, 2025

(54) REGRESSION DETECTION AND CORRECTION IN RELATIONSHIPS BETWEEN PERFORMANCE INDICATORS AND AI METRICS

(71) Applicant: International Business Machines Corporation, Armonk, NY (US)

(72) Inventors: Lukasz G. Cmielowski, Cracow (PL); Wojciech Sobala, Cracow (PL); Maksymilian Erazmus, Zasow (PL); Rafal Bigaj, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 17/022,192

(22) Filed: Sep. 16, 2020

(65) Prior Publication Data
US 2022/0083816 A1   Mar. 17, 2022

(51) Int. Cl.
| | |
|---|---|
| *G06F 18/21* | (2023.01) |
| *G06F 17/15* | (2006.01) |
| *G06F 17/18* | (2006.01) |
| *G06N 3/08* | (2023.01) |
| *G06N 3/09* | (2023.01) |
| *G06N 20/00* | (2019.01) |
| *G06V 10/766* | (2022.01) |
| *G06V 10/776* | (2022.01) |

(52) U.S. Cl.
CPC ............ *G06F 18/217* (2023.01); *G06F 17/15* (2013.01); *G06F 17/18* (2013.01); *G06N 3/08* (2013.01);
(Continued)

(58) Field of Classification Search
CPC ........ G06F 17/15; G06F 17/18; G06F 18/217; G06N 3/08; G06N 3/0895; G06N 3/09;
(Continued)

(56) References Cited

U.S. PATENT DOCUMENTS

| | | | |
|---|---|---|---|
| 7,509,229 B1 * | 3/2009 | Wen ...................... | H04L 41/16 702/179 |
| 2003/0079160 A1 * | 4/2003 | McGee ................... | G06F 17/18 714/39 |

(Continued)

OTHER PUBLICATIONS

Anonymous et al., "Manage AI, with trust and confidence in business outcomes", IBM, Jul. 21, 2020, 4 Pages.
(Continued)

*Primary Examiner* — Shane D Woolwine
(74) *Attorney, Agent, or Firm* — Yee & Associates, P.C.

(57) ABSTRACT

A computer implemented method for detecting regression in a relationship between a performance indicator and AI metrics includes calculating a baseline threshold of regression degradation according to a historical correlation coefficient corresponding to a performance indicator and a set of AI metrics, calculating a current correlation coefficient according to one or more current data records, identifying a correction constant according to the current correlation coefficient and a desired correlation coefficient, generating a function to predict correction constants corresponding to performance indicator data and the set AI metrics, determining a delta correction constant for each AI metric of the set of AI metrics, applying the determined delta correction constant to the set of AI metrics, and identifying a subset of AI metric outliers according to the calculated baseline threshold and the determined delta correction constant.

14 Claims, 6 Drawing Sheets

(52) U.S. Cl.
CPC ............... *G06N 3/09* (2023.01); *G06N 20/00* (2019.01); *G06V 10/766* (2022.01); *G06V 10/776* (2022.01)

(58) Field of Classification Search
CPC ...... G06N 3/092; G06N 3/0985; G06N 20/00; G06N 20/10; G06N 20/20; G06V 10/766; G06V 10/776
See application file for complete search history.

(56) References Cited

U.S. PATENT DOCUMENTS

2004/0138933 A1  7/2004  Lacomb
2018/0374193 A1* 12/2018 Park .......................... G06T 7/11
2020/0117765 A1* 4/2020 Sengupta ................ G06F 30/20

OTHER PUBLICATIONS

Disclosed Anonymously, "System for optimised business & AI metrics storage and calculation", An IP.com Prior Art Database Technical Disclosure, IP.com No. IPCOM000261944D, IP.com Electronic Publication Date: Apr. 20, 2020, 3 Pages.

Cmielowski et al., "Does your key performance indicator justify AI investment?", Published in Medium, Jan. 10, 2020, 7 Pages.

Regkas, Georgios, "AI Trust, Model Bias & Explainability using IBM Watson Openscale", Published in Medium, Sep. 11, 2019, 10 Pages.

* cited by examiner

```
plt.plot(x, y, 'o');
plt.plot(x[[0, -1]], [coef[0] + i*coef[1] for i in x[[0, -1]]]);
```

```
delta = list(linspace(0.01, 20, 50))

r_data = []
for d in delta:
    ys = resid*d + coef[0] + coef[1]*x
    ys = ys/ys.std()
    r_data.append([d, stats.lingress(x, ys.).rvalue])
r_data = list(zip(*r_data))

plt.plot(r_data[0], r_data[1], 'o');
plt.xlabel('d');
plt.ylabel('correlation coefficient');
```

```
from scipy.optimize import curve_fit def func(x, a, b, c):
    return 1/(1+a*np.exp(-b/x)+c*x)

popt, pcov = curve_fit(funct, r_data[0], r_data[1])
print("Value at O:  (:2.4f)".format(func(0.0, popt[0], popt[1], popt[2])))

[-0.75629171   0.56823931     0.57915813]
Value at 0: 1.0000

/anaconda3/envs/pycharm36/lib/python3.6/nite-packages/ipykernel_launcher.py:2:
RuntimeWarning: divide by zero encountered in double_scalars yp = func(np.array(r_data[0]) popt[0], popt[1], popt[2])
```

FIG. 3C

```
from scipy.optimize import linearmixing def fun_inv(r=0.2):
    def f(x):
        return func(x=x, a=popt[0], b=popt[1], c=popt[2]) - r
    x0 = linearmixing(f, xin=0.01, iter=1000)
    delta = np.abs(func(x0, a=popt[0], b=popt[1], c=popt[2]) - r)
    if delta > 0.01:
        raise ValueError('Inversion error: (:2.3f)'.format(delta))
    return x0 d = fun_inv(r=UCL)
print(d)

… # REGRESSION DETECTION AND CORRECTION IN RELATIONSHIPS BETWEEN PERFORMANCE INDICATORS AND AI METRICS

BACKGROUND

The present invention relates generally to the field of machine learning, and more specifically to analyzing the health of a machine learning model.

Machine learning is an application of artificial intelligence (AI) that provides systems the ability to automatically learn and improve from experience without explicit programming. Machine learning focuses on the development of computer programs that can access data and use it to learn for themselves. Machine learning algorithms build a mathematical model based on sample data, or training data, in order to make predictions or decisions without being explicitly programmed to do so. Machine learning algorithms are utilized across a variety of applications where it may be difficult or infeasible to develop conventional algorithms to perform necessary tasks.

SUMMARY

As disclosed herein, a computer implemented method for detecting regression in a relationship between a performance indicator and AI metrics includes calculating a baseline threshold of regression degradation according to a historical correlation coefficient corresponding to a performance indicator and a set of AI metrics, calculating a current correlation coefficient according to one or more current data records, identifying a correction constant according to the current correlation coefficient and a desired correlation coefficient, generating a function to predict correction constants corresponding to performance indicator data and the set AI metrics, determining a delta correction constant for each AI metric of the set of AI metrics, applying the determined delta correction constant to the set of AI metrics, and identifying a subset of AI metric outliers according to the calculated baseline threshold and the determined delta correction constant. Embodiments of the present invention may further include presenting the subset of AI metric outliers to a user. Embodiments of the present invention may further include correcting the subset of AI metric outliers. A computer program product and computer system corresponding to the method are also disclosed.

BRIEF DESCRIPTION OF THE DRAWINGS

FIG. 3C depicts a series of commands and a graph corresponding to an appropriate correction constant prediction function in accordance with an embodiment of the present invention;

FIG. 3D depicts example commands for determining a delta correction constant in accordance with an embodiment of the present invention;

DETAILED DESCRIPTION

Embodiments of the present invention analyze a correlation between AI metrics corresponding to a machine learning system and a set of key performance indicators corresponding to said machine learning system.

The present invention will now be described in detail with reference to the Figures. Implementation of embodiments of the invention may take a variety of forms, and exemplary implementation details are discussed subsequently with reference to the Figures.

Figure 1:
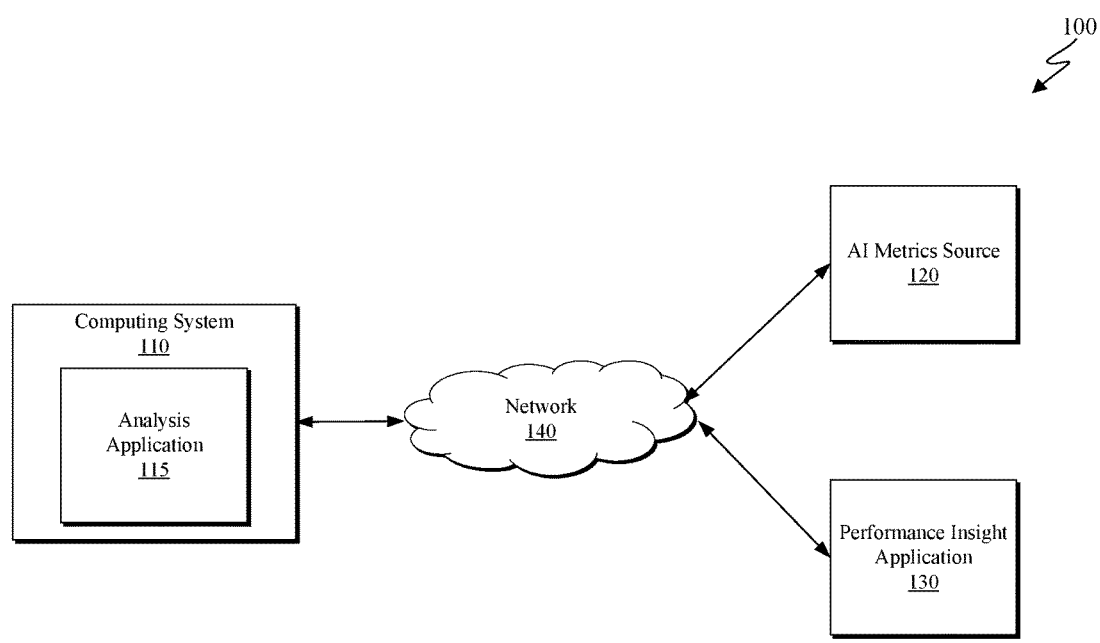
FIG. 1 is a block diagram depicting a correlation analysis system in accordance with at least one embodiment of the present invention.

FIG. 1 is a block diagram depicting a correlation analysis system 100 in accordance with at least one embodiment of the present invention. As depicted, correlation analysis system 100 includes computing system 110, AI metrics source 120, performance insight application 130, and network 140. It should be appreciated that the depicted embodiment is not intended to be limiting, and that additional configurations of a correlation analysis system may also be appropriate. For example, while AI metrics source 120 and performance insight application 130 are depicted as entirely separate from computing system 110 and connected across network 140, in additional embodiments either (or both) of an AI metrics source and a performance insight application may be hosted on a same computing system as an analysis application. Correlation analysis system 100 may provide insights regarding the performance of a machine learning system by identifying AI metric outliers relative to batches of key performance indicators.

Computing system 110 can be a desktop computer, a laptop computer, a specialized computer server, or any other computer system known in the art. In some embodiments, computing system 110 represents computer systems utilizing clustered computers to act as a single pool of seamless resources. In general, computing system 110 is representative of any electronic device, or combination of electronic devices, capable of receiving and transmitting data, as described in greater detail with regard to FIG. 1. Computing system 110 may include internal and external hardware components, as depicted and described in further detail with respect to FIG. 4.

As depicted, computing system 110 includes analysis application 115. Analysis application 115 may be configured to execute a regression detection method to identify regression metrics corresponding to a set of AI metrics and a set of key performance indicators. In some embodiments, analysis application 115 receives a set of AI metrics from AI metrics source 120 via network 140. As described above, in other embodiments, an analysis application and an AI metrics source may be operably connected in a different manner, and may therefore not require the use of a network for transmission of the set of AI metrics. In some embodiments, analysis application 115 receives a set of key performance indicators from performance insight application 130 via network 140. As described above, in other embodiments, an analysis application and a performance insight application may be operably connected in a different manner, and may therefore not require the use of a network for transmission of the set of key performance indicators. Analysis application 115 may be configured to send a query to AI metrics source 120 requesting the set of AI metrics. Analysis application 115 may additionally be configured to send a query to performance insight application 130 requesting the set of key performance indicators. In at least some embodiments, analysis application 115 is configured to execute the steps of: calculating a baseline threshold of regression degradation according to a historical correlation coefficient corresponding to a performance indicator and a set of AI metrics, calculating a current correlation coefficient according to one or more current data records, identifying a correction constant according to the current correlation coefficient and a desired correlation coefficient, generating a function to predict correction constants corresponding to performance indicator data and the set AI metrics, determining a delta correction constant for each AI metric of the set of AI metrics, applying the determined delta correction constant to the set of AI metrics, and identifying a subset of AI metric outliers according to the calculated baseline threshold and the determined delta correction constant. Analysis application 115 may additionally be configured to provide the subset of AI metric outliers to a user. In additional embodiments, analysis application 115 is configured to correct or remove the subset of AI metric outliers.

AI metrics source 120 may be a data source configured to store AI metrics corresponding to a machine learning system of interest. In other embodiments, AI metrics source 120 corresponds to a machine learning system itself, configured to provide a set of AI metrics to analysis application 115 when available. Generally, AI metrics source 120 refers to any application or system capable of providing a set of AI metrics corresponding to a machine learning system to analysis application 115.

Performance insight application 130 may be a data source configured to store key performance indicators corresponding to a machine learning system of interest. In other embodiments, performance insight application 130 corresponds to a machine learning system itself, configured to provide a set of key performance indicators to analysis application 115 when available. In yet additional embodiments, performance insight application 130 corresponds to an application configured to analyze the performance of a machine learning system. Generally, performance insight application 130 refers to any application or system capable of providing a set of key performance indicators corresponding to a machine learning system's performance to analysis application 115.

Network 140 can be, for example, a local area network (LAN), a wide area network (WAN) such as the Internet, or a combination of the two, and include wired, wireless, or fiber optics connections. In general, network 140 can be any combination of connections and protocols that will support communications between computing system 110, AI metrics source 120, and performance insight application 130.

Figure 2:
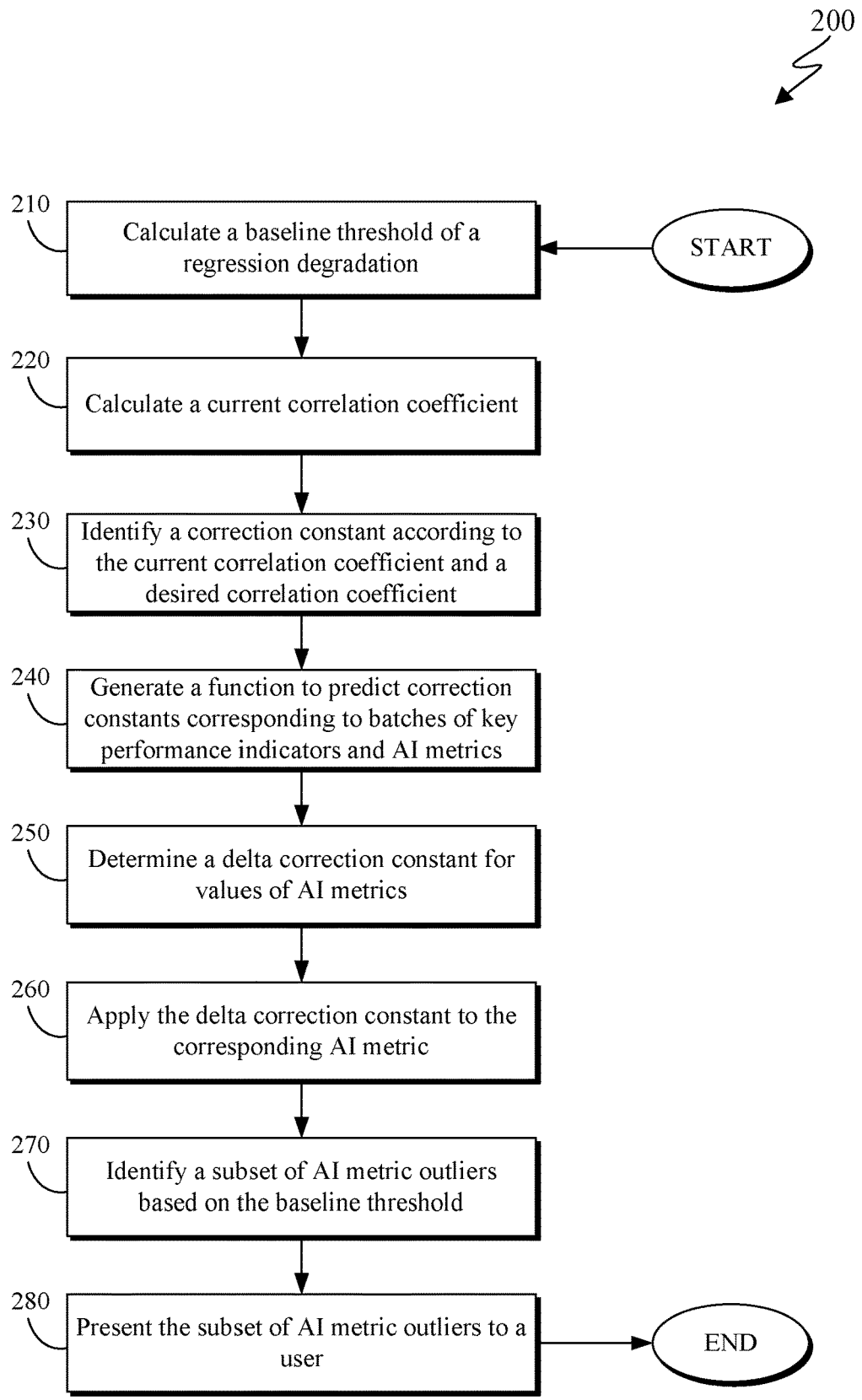
FIG. 2 is a flowchart depicting a regression detection method in accordance with at least one embodiment of the present invention.

FIG. 2 is a flowchart depicting a regression detection method 200 in accordance with at least one embodiment of the present invention. As depicted, regression detection method 200 includes calculating (210) a baseline threshold of a regression degradation, calculating (220) a current correlation coefficient, identifying (230) a correction constant according to the current correlation coefficient and a desired correlation coefficient, generating (240) a function to predict correction constants corresponding to batches of key performance indicators and metrics, determining (250) a delta correction constant for values of AI metrics, applying (260) the delta correction constant to the corresponding AI metric, identifying (270) a subset of AI metric outliers based on the baseline threshold, and presenting (280) the subset of AI metric outliers to a user. Regression detection method 200 may enable enhanced ability to identify AI metric outliers relative to batches of key performance indicators.

Calculating (210) a baseline threshold of a regression degradation may include identifying an initial baseline threshold of a regression degradation such that said baseline may be used to monitor relationship trend degradation. In some embodiments, calculating (210) a baseline threshold of a regression degradation includes calculating an upper limit according to historical data. The upper limit may be calculated using X Control Chart techniques. For a set of "n" batches of data, the data from some number k of the oldest batches (wherein k<n) may be used as baseline data. The dataset from these k batches will henceforth be referred to as "C". The upper control limit (or UCL) may be calculated according to the following equation:

$$UCL = AVERAGE(C) + R*A2$$

With respect to the above equation, R refers to the difference between MAX(C) and MIN(C), and A2 is a correction constant. A2 can be read from statistical tables, and is dependent on the size of n. In at least some embodiments, each batch of data includes key performance indicators. The batches of data may additionally include artificial intelligence (AI) metrics. The AI metrics may include, but are not limited to, any of: drift, bias, accuracy, and uncertainty.

Figure 3A:
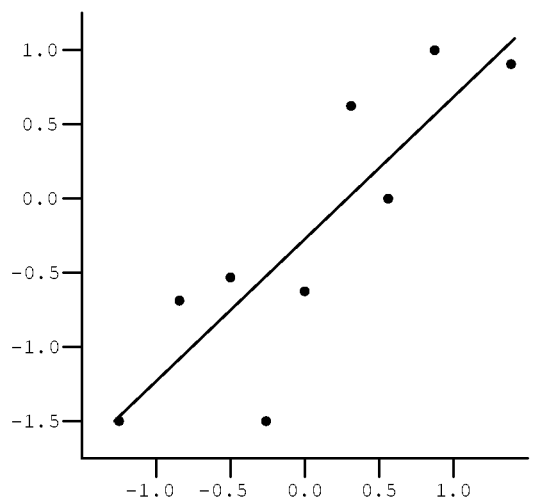
FIG. 3A depicts example commands for plotting a regression line with respect to a calculated current correlation coefficient in accordance with an embodiment of the present invention.

Calculating (220) a current correlation coefficient may including identifying a current correlation coefficient for the last n batches of data. Many methods for calculating correlation coefficients exist in the art; any method for identifying a correlation coefficient between key performance indicators and AI metrics may be suitable for this step. In at least some embodiments, calculating (220) a current correlation coefficient provides a current correlation coefficient calculated for the last n batches of data. Calculating (220) a current correlation coefficient may additional include generating a linear regression line according to the key performance indicators and AI metrics. FIG. 3A depicts example commands which may be utilized for plotting a regression line with respect to the calculated current correlation coefficient. It should be appreciated that the commands depicted with respect to this Figure, as well as the data leveraged by said commands, merely indicated a single exemplary embodiment, and many other command types and data items would be appropriate for calculation of the current correlation coefficient.

Figure 3B:
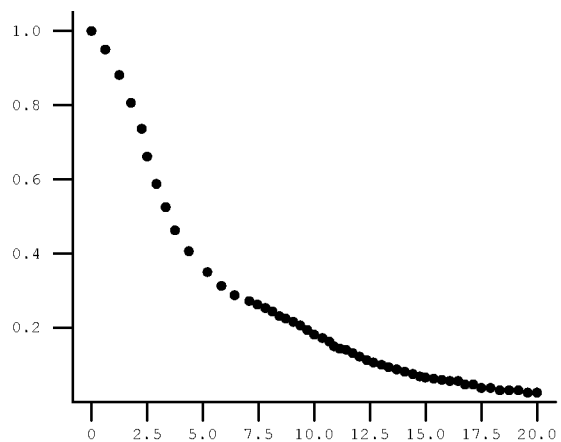
FIG. 3B depicts example commands and a corresponding graph which may be utilized to identify a correction constant in accordance with an embodiment of the present invention.

Identifying (230) a correction constant according to the current correlation coefficient and a desired correlation coefficient may include analyzing the relationship between the current correlation coefficient and a desired correlation coefficient. In at least some embodiments, the change to be made to improve the current correlation coefficient to the desired level is referred to as 'd'. In other words, 'd' shows the correlation between simulated change and correlation coefficient value. In at least some embodiments, 'd' is generated as a series of data. The correlation coefficient depending on 'd' may be calculated using a regression line or formula as determined in the previous step with respect to the current correlation coefficient. FIG. 3B depicts example commands, and a corresponding graph, which may be utilized to identify a correction constant. With respect to the depicted embodiment, 'd' is generated as a series of data separated by 0.01. It should be appreciated that FIG. 3B corresponds to a single example of appropriate commands, and resultant graph, for identifying a correction constant; in other embodiments, many additional commands may also be appropriate for identifying a correction constant.

Generating (240) a function to predict correction constants corresponding to batches of key performance indicators and metrics may include creating a function that will approximate a relationship between simulated change and correlation coefficient value. In at least some embodiments, the generated prediction function is utilized to calculate a delta for real data points. FIG. 3C depicts a series of commands, as well as a graph, corresponding to one embodiment of an appropriate function. It should be noted that, with respect to the depicted embodiment, the function used for approximation transforms data from 0 to infinite into data points within the range [0,1]. The presented function is appropriate when the distributions of the utilized data are relatively normal. With respect to the depicted embodiment, the resultant function fits the discrete observations from the previous step perfectly, and the function is therefore returned as an appropriate function for predicting correction constants. In other embodiments, where a first function may not be an appropriate, the step may repeat itself to identify a different function until one is identified which more accurately fits the existing data. It should be appreciated that FIG. 3C corresponds to only a single example of appropriate commands for generating a function; in other embodiments, many other commands may be appropriate for generating a function to predict correction constants corresponding to batches of key performance indicators and metrics.

Determining (250) a delta correction constant for values of AI metrics may include conducting inverse transformation to identify a delta correction constant. In at least some embodiments, determining (250) a delta correction constant for values of AI metrics includes taking a desired threshold (UCL as described previously) and the previously generated prediction function, and generating a correction constant accordingly. The correction constant may be identified according to the following equation:

$$g(d) = f(d) - UCL$$

FIG. 3D depicts example commands which may be appropriate for determining the delta correction constant according to the identified function and the previously identified UCL. It should be appreciated that FIG. 3D corresponds to a single example of commands which may be appropriate for determining the delta correction constant; in additional embodiments, many alternative commands may be appropriate.

Applying (260) the delta correction constant to the corresponding AI metric may include utilizing the identified delta correction constant 'd' along with the original set of AI metrics and linear regression function to correct the AI metric data. With respect to the application of the delta correction constant 'd', consider a set of AI metrics 'y'. For this set of AI metrics, a corresponding set of "corrected" metrics 'YS' may be calculated according to the corresponding correction constants such that YS=Y−d.

Identifying (270) a subset of AI metric outliers based on the baseline threshold may include determining which of the AI metrics require the most 'correction'. In at least some embodiments, the subset of AI metric outliers corresponds to one or more AI metrics for which the calculated required change 'r' is the largest. With respect to some embodiments, an AI metric may be considered an outlier if its corresponding calculated required change exceeds a certain predetermined threshold. In addition to identifying the AI metric outliers themselves, the records or batches which correspond to said AI metric outliers may additionally be identified. In other words, identifying (270) a subset of AI metric outliers may additionally include identifying the data records contributing to these AI metric outliers. In at least some embodiments, identifying the data records contributing to the AI metric outliers includes identifying data items which can be corrected or removed to improve the fit of the AI metrics.

Presenting (280) the subset of AI metric outliers to a user may include providing an indication of which AI metrics have been flagged as outliers. In at least some embodiments, presenting (280) the subset of AI metric outliers to a user includes additionally providing an indication of which data items/data records contributed to the outlier nature of the identified subset of AI metric outliers, such that the data items can be repaired or removed. The AI metric outliers may be provided as a list of metrics that need to be addressed in order to achieved a desired correction coefficient value.

Figure 4:
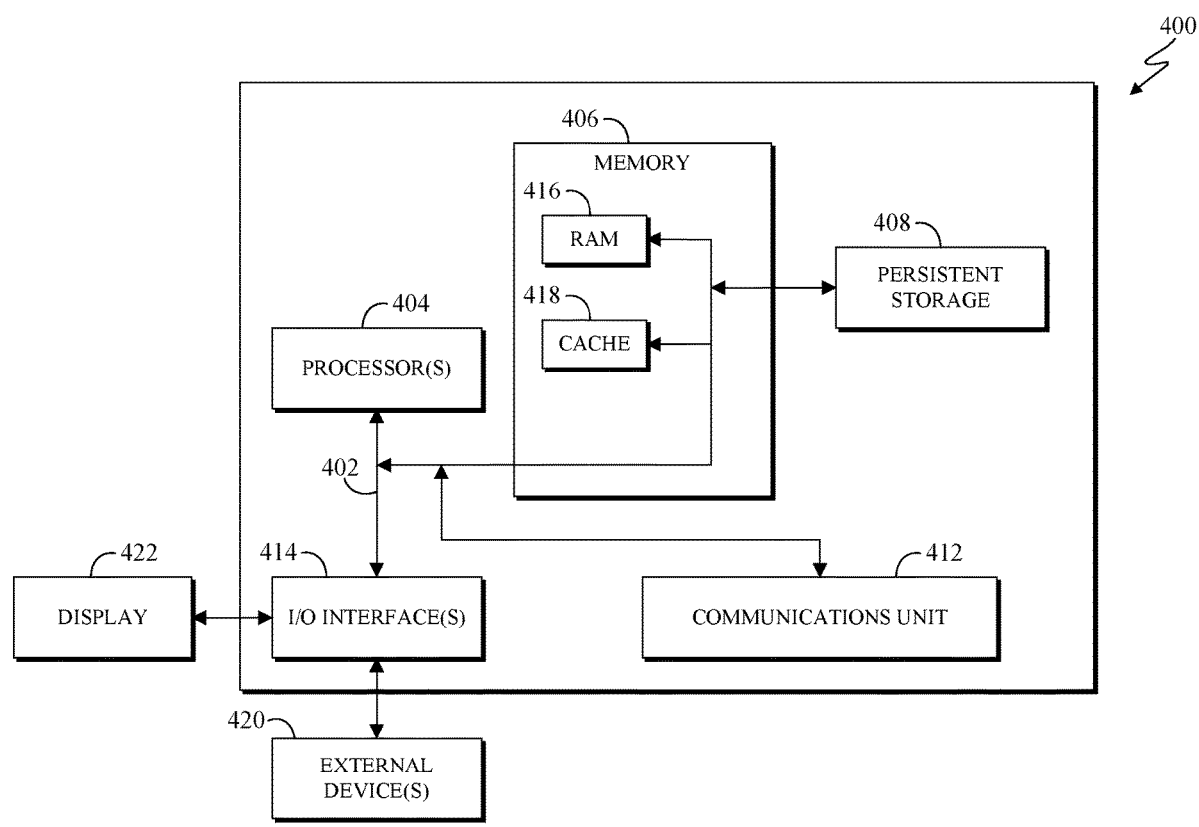
FIG. 4 is a block diagram of components of a computing system executing the image analysis system in accordance with an embodiment of the present invention.

FIG. 4 depicts a block diagram of components of computing system 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400.

For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for detecting regression in a relationship between a performance indicator and artificial intelligence (AI) metrics, the method comprising:
   sending a query to a machine learning system requesting a set of AI metrics;
   sending another query to a performance insight application requesting a performance indicator, wherein the performance insight application is configured to provide a set of key performance indicators corresponding to a performance of the machine learning system;
   calculating a baseline threshold of regression degradation according to a historical correlation coefficient corresponding to a performance indicator and the set of AI metrics;
   calculating a current correlation coefficient according to one or more current data records;
   identifying a correction constant according to the current correlation coefficient and a desired correlation coefficient;
   generating a function to predict correction constants corresponding to performance indicator data and the set of AI metrics;
   determining a delta correction constant for each AI metric of the set of AI metrics, wherein the delta correction is determined based on the difference between the historical correlation coefficient and an upper control limit for monitoring trend degradation;
   applying the determined delta correction constant to the set of AI metrics;
   identifying a subset of AI metric outliers according to the calculated baseline threshold and the determined delta correction constant; and
   correcting the subset of AI metric outliers, wherein generating a function to predict correction constants corresponding to the performance indicator data and the set of AI metrics includes creating a function to approximate a relationship between a correlation coefficient value and a simulated change.

2. The computer implemented method of claim 1, wherein identifying a correction constant according to the current correlation coefficient and a desired correlation coefficient includes calculating a difference between the desired correlation coefficient and the current correlation coefficient.

3. The computer implemented method of claim 1, wherein the AI metrics include drift, bias, accuracy, and uncertainty.

4. The computer implemented method of claim 1, wherein the baseline threshold includes the upper control limit for monitoring trend degradation.

5. The computer implemented method of claim 1, further comprising presenting the subset of AI metric outliers to a user.

6. A computer program product for detecting regression in relationship between a performance indicator and artificial intelligence (AI) metrics, the computer program product comprising:
   one or more computer readable storage media and program instructions stored on the one or more computer readable storage media, the program instructions comprising instructions to:
   send a query to a machine learning system requesting a set of AI metrics;
   send another query to a performance insight application requesting a performance indicator, wherein the performance insight application is configured to provide a set of key performance indicators corresponding to a performance of the machine learning system;
   calculate a baseline threshold of regression degradation according to a historical correlation coefficient corresponding to a performance indicator and the set of AI metrics;
   calculate a current correlation coefficient according to one or more current data records;
   identify a correction constant according to the current correlation coefficient and a desired correlation coefficient;
   generate a function to predict correction constants corresponding to performance indicator data and the set of AI metrics;
   determine a delta correction constant for each AI metric of the set of AI metrics, wherein the delta correction is determined based on the difference between the historical correlation coefficient and an upper control limit for monitoring trend degradation;
   apply the determined delta correction constant to the set of AI metrics;
   identify a subset of AI metric outliers according to the calculated baseline threshold and the determined delta correction constant; and
   correct the subset of AI metric outliers, wherein program instructions to generate a function to predict correction constants corresponding to performance indicator data and AI metrics comprise instructions to create a function to approximate a relationship between a correlation coefficient value and a simulated change.

7. The computer program product of claim 6, wherein instructions to identify a correction constant according to the current correlation coefficient and a desired correlation coefficient comprise instructions to calculate a difference between the desired correlation coefficient and the current correlation coefficient.

8. The computer program product of claim 6, wherein the AI metrics include drift, bias, accuracy, and uncertainty.

9. The computer program product of claim 6, wherein the baseline threshold includes the upper control limit for monitoring trend degradation.

10. The computer program product of claim 6, further comprising program instructions to present the subset of AI metric outliers to a user.

11. A computer system for detecting regression in relationship between a performance indicator and artificial intelligence (AI) metrics, the computer system comprising:
- one or more computer processors;
- one or more computer-readable storage media;
- program instructions stored on the computer-readable storage media for execution by at least one of the one or more processors, the program instructions comprising instructions to:
- send a query to a machine learning system requesting a set of AI metrics;
- send another query to a performance insight application requesting a performance indicator, wherein the performance insight application is configured to provide a set of key performance indicators corresponding to a performance of the machine learning system;
- calculate a baseline threshold of regression degradation according to a historical correlation coefficient corresponding to a performance indicator and the set of AI metrics;
- calculate a current correlation coefficient according to one or more current data records;
- identify a correction constant according to the current correlation coefficient and a desired correlation coefficient;
- generate a function to predict correction constants corresponding to performance indicator data and the set of AI metrics;
- determine a delta correction constant for each AI metric of the set of AI metrics, wherein the delta correction is determined based on the difference between the historical correlation coefficient and an upper control limit for monitoring trend degradation;
- apply the determined delta correction constant to the set of AI metrics;
- identify a subset of AI metric outliers according to the calculated baseline threshold and the determined delta correction constant; and
- correct the subset of AI metric outliers, wherein instructions to generate a function to predict correction constants corresponding to the performance indicator data and the set of AI metrics comprise instructions to create a function to approximate a relationship between a correlation coefficient value and a simulated change.

12. The computer system of claim 11, wherein instructions to identify a correction constant according to the current correlation coefficient and a desired correlation coefficient comprise instructions to calculate a difference between the desired correlation coefficient and the current correlation coefficient.

13. The computer system of claim 11, wherein the baseline threshold includes the upper control limit for monitoring trend degradation.

14. The computer system of claim 11, further comprising program instructions to present the subset of AI metric outliers to a user.

* * * * *